United States Patent
Gelfgat et al.

[11] 3,807,903
[45] Apr. 30, 1974

[54] METHOD AND MEANS FOR MAGNETOHYDRODYNAMICALLY CONTROLLING THE FLOW RATE OF A CURRENT-CONDUCTING LIQUID

[76] Inventors: Jury Moiseevich Gelfgat, 252/I, kv. 57, Riga; Olgert Adolfovich Lielausis, Miera 22, kv. 19, Latviiskaya; Yanis Mikelevich Sunakslis, Liepu 25, kv. 4, Liepaya Latviiskoi; Alexandr Gennadievich Shtern, Miera 22, kv. 13, Latviiskaya, all of U.S.S.R.

[22] Filed: Oct. 29, 1971

[21] Appl. No.: 193,815

[52] U.S. Cl.................... 417/50, 310/11
[51] Int. Cl............................. H02k 45/00
[58] Field of Search........... 310/92, 93, 10; 417/50; 137/251; 3/1, DIG. 1, DIG. 2, DIG. 3; 322/47

[56] References Cited
UNITED STATES PATENTS

| | | | |
|---|---|---|---|
| 2,702,004 | 2/1955 | Blake et al. | 310/11 X |
| 3,005,116 | 10/1961 | Reegg | 310/11 |
| 3,524,086 | 8/1970 | Lindley | 310/11 |
| 2,798,434 | 7/1957 | Brill et al. | 310/11 X |
| 3,102,224 | 8/1963 | Maeder | 322/47 |
| 3,201,622 | 8/1965 | Thring | 310/11 |

FOREIGN PATENTS OR APPLICATIONS

| | | | |
|---|---|---|---|
| 236,983 | 7/1969 | U.S.S.R. | 417/50 |
| 225,019 | 12/1968 | U.S.S.R. | 417/50 |
| 1,107,099 | 3/1968 | Great Britain | 310/12 |
| 1,037,789 | 8/1958 | Germany | 137/251 |

*Primary Examiner*—D. F. Duggan
*Attorney, Agent, or Firm*—Eric H. Waters; Alex K. Roberts; Julian H. Cohen

[57] ABSTRACT

A method and means is provided for controlling the flow rate of a current-conducting liquid. In the flow of a current-conducting liquid flowing between the poles of a magnetic system there are provided regions extending along the flow wherein there arise different conditions of electric current induction. Such regions having different conditions of electric current induction are established by varying magnetic density along the flow, for example, by forming the magnetic system poles shaped as a number of alternating protrusions and recesses.

6 Claims, 8 Drawing Figures

METHOD AND MEANS FOR MAGNETOHYDRODYNAMICALLY CONTROLLING THE FLOW RATE OF A CURRENT-CONDUCTING LIQUID

Known in the art is a method for controlling the flow rate of a current-conducting liquid flowing between the poles of a magnetic system. According to this method, the conditions of electric current induction are invariable in the portion of the flow disposed between the poles of a magnetic system.

A disadvantage of this method is its low efficiency, particularly in the event that such flows are passed through channels formed from non-conducting materials. At the same time, the application of conducting materials to form such channels in most cases, in particular when dealing with molten metals, is not feasible. Furthermore, the application of channels formed from conducting materials gives rise to a contact electric resistance in the channel wall-liquid contact area. This resistance depends on a plurality of factors and hardly lends itself to control. Consequently, the resistance effect generally brings about substantial random elements in the operation of the control device.

It is an object of the present invention to avoid this disadvantage.

It is another object of the present invention to develop a method for magneto-hydrodynamically controlling the flow of a current-conducting liquid flowing between the poles of a magnetic system and to provide a device for realizing said method which has high efficiency, particularly when employing channels made of non-conducting materials.

In order to solve the problems noted above, there has been developed a method for magneto-hydrodynamically controlling the flow rate of a current-conducting liquid flowing between the poles of a magnetic system according to the present invention, whereby in said liquid flow there are provided regions extending through out the length of the flow between the poles of the magnetic system and having different conditions of electric current induction.

Such regions having different conditions of electric current induction may be established by varying magnetic density, as well as by varying the velocity of the liquid. Regions with different conditions of electric current induction are preferably established by varying the heat exchange of said flow with the surrounding medium or by varying the take-off of electric energy by the surrounding medium.

In order to realize the method of this invention, there is preferably provided a device comprising a magnetic system and a channel for a current-conducting liquid disposed between the poles of this system and, according to the present invention, at least one pole of the magnetic system must be formed as a number of alternating protrusions and recesses. It is desirable that two adjacent protrusions of one and the same shaped pole should be spaced by two times the cross-section of the through-flow portion of the channel in a longitudinal plane in parallel relation with the poles of the magnetic system, and the depth of the recesses should be not less than the distance between the protrusions of one pole and the opposite pole.

At least one pole of the magnetic system is preferably formed as a set of plates with at least one plate thereof mounted in movable position with respect thereto. The thickness of each plate may be equal to the lateral dimension of the through-flow portion of the channel in a longitudinal plane in parallel relation with the poles of the magnetic system.

At least one pole of the magnetic system is preferably provided with windings mounted in the recesses thereof.

Besides, in order to realize the method of the present invention, there is be preferably provided a device comprising a magnetic system and a channel for a current-conducting liquid disposed between the poles of the magnetic system, with the through-flow portion of the channel formed, in accordance with the present invention, as a number of alternating widenings and contractions, the ratio of the cross-sectional areas thereof being approximately not less than 1.5:1.

In order to provide regions having different conditions of electric current induction in the flow, there may be provided a device comprising a magnetic system and a channel for a current-conducting liquid disposed between the poles of the system, with the channel provided, in accordance with the present invention, with an outer cooling jacket.

The method and means for magneto-hydrodynamically controlling the flow rate of current-conducting liquids of this invention are conductive to the solution of a number of vital technical problems of regulation arising whenever new highly effective continuous processes are being introduced in production, particularly in metallurgy.

The present invention is illustrated both as to the method and apparatus thereof in the accompanying drawings, wherein.

Figure 1:
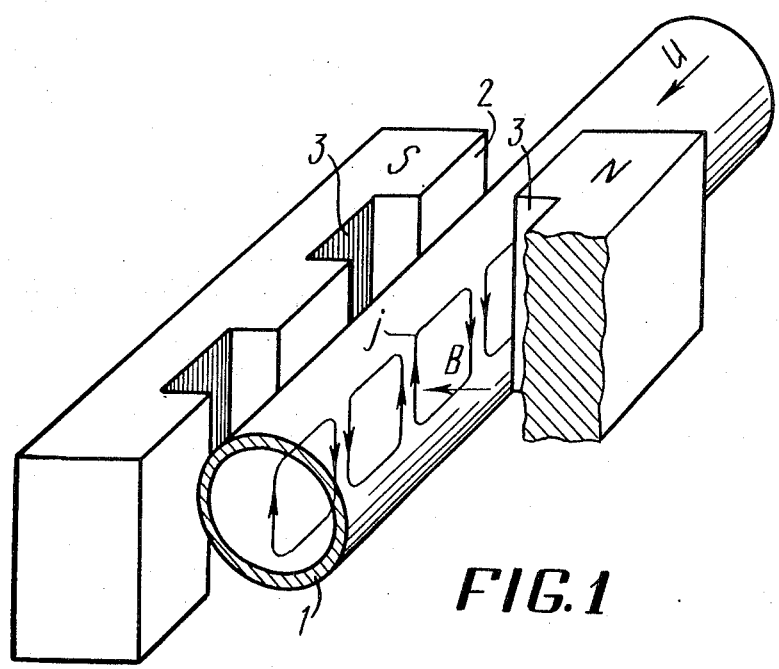
FIG. 1 is a schematic illustration of a device in accordance with one embodiment of this invention wherein the poles are shaped.

Considering now the present invention in some detail, there will next be discussed the physical phenomena occurring in the flow of a current-conducting liquid in the presence of a magnetic field. As a current-conducting liquid is flowing through a pipe disposed in a magnetic field, there are induced electric currents in the flow whose magnitude at a constant flow velocity and magnetic density depends on the electric resistance of the medium through which these currents are passed. Herein the flow rate of the liquid is determined by three factors, viz., losses for viscous friction, losses for heat dissipation depending on the size of currents passing in the liquid, and losses in the zone of "terminal" effects (at the ingress into and egress from the magnetic field). The latter losses are considered as complementing the total losses for friction and are henceforth disregarded.

In the event as is usual that the walls of the pipeline are non-conducting, the magnitude of heat dissipation in the flow is low enough, inasmuch as the currents induced in the flow pass through the thin layers adjacent the walls having substantial values of resistance.

If the flow is in contact with the surrounding conducting walls and the latter's relative conductivity is higher than that of the liquid, the induced currents flow through the pipeline walls, and, what with their low electric resistance, the current magnitude sharply grows. In such a case, the losses due to heat dissipation exceed to a very great extent the losses due to viscous friction, and affect basically the magnitude of the flow rate of the liquid. Therefore, in terms of improved efficiency of current-conducting liquid flow rate control, the case of a flow through a pipeline having current-conducting walls is the most favorable.

If a flow through a pipeline with non-conducting walls is effected such that the currents induced in the liquid may pass through regions having a small electric resistance, as is the case with conducting walls, the size of currents through the liquid will be seen to go up abruptly thereby causing material dissipation of the energy of motion of the flow. Thus, there will be imitated the case of a liquid flow through a pipeline having current-conducting walls. Obviously, for the currents induced in the liquid to flow through regions with a small electric resistance, the latter should be simultaneously characterized by a small value of induced emf.

It is herein contemplated that there shall be established along the flow of a current-conducting liquid flowing between the poles of a magnetic system regions having different conditions of electric current induction, wherein the values of electric resistances are small and the values of induced emf are different.

Several embodiments of the present invention are envisaged. According to one, regions with different conditions of electric current induction are established by the setting up, along the flow, of portions having different magnetic densities with the result that in portions with a large and small magnetic density there arise emf's of different magnitudes thereby providing for the passage of electric currents. The latter pass through the flow nucleus having a small electric resistance and consequently attain a substantial magnitude.

According to another embodiment, regions having different conditions of electric current induction are provided by establishing along the flow portions characterized by different velocities of the current-conducting liquid. In this case in portions characterized by a great and low flow velocities there will arise different-magnitude emf's thereby providing for the passage of currents. The latter will be seen to pass through the flow nucleus and low velocity portions and consequently will attain a substantial magnitude.

According to yet another embodiment, such regions are established by setting up along the flow portions having different conditions of heat exchange with the surrounding medium, thereby giving rise to zones wherein the liquid will have a lowered temperature (and hence, another velocity, another viscosity, etc.) with the resultant variations in the electric current induction conditions from one zone to another.

According to still another embodiment, said regions are provided by establishing, in the channel through which the liquid is passed, portions having different conditions of electric energy take-off by the surrounding medium, thereby enhancing the electric currents induced in the liquid.

The present invention can be realized as a combination of the above-described embodiments. In all cases, an increase in the currents induced in the liquid invariably entails an increase in the value of heat dissipation of energy taken off from the flow of a current-conducting liquid, which is exactly what provides for an effective control of its flow rate.

A device for realizing the method of magneto-hydrodynamic control of the flow rate of a current-conducting liquid in accordance with the present invention whereby regions with different conditions of electric current induction are established by varying magnetic density, comprises a magnetic system with the poles N and S (FIG. 1) and a round pipe 1 wherein a current-conducting liquid moves at a velocity $u$. The pipe 1 is disposed intermediate the poles N and S of the magnetic system. The poles N and S have a number of alternating protrusions 2 and recesses 3 disposed opposite one another. Two similar points of adjacent protrusions or recesses of each pole are spaced by a value equal to two times the inner diameter of the pipe, while the depth of the recesses about the poles N and S of the magnetic system is equal to the distance between the opposite protrusions of the poles.

The device operates in the following manner:

As a current-conducting liquid flows through the pipe 1 at the velocity u in a magnetic field with a density B, there are induced in the liquid electric currents $j$ whose magnitude is determined by the difference in induced emf in the zones intermediate the protrusions and the recesses of the poles N and S as well as by the electric resistance of the liquid portions through which same pass. As indicated in FIG. 1, in this case the currents $j$ flow in the main through the flow nucleus whose electric resistance is negligible. Therefore, the magnitudes of the currents $j$ are material enough to cause substantial heat losses thereby effectively affecting the flow rate. The flow rate magnitude is controlled by varying the magnetic density B using any known technique for the purpose.

Figure 2:
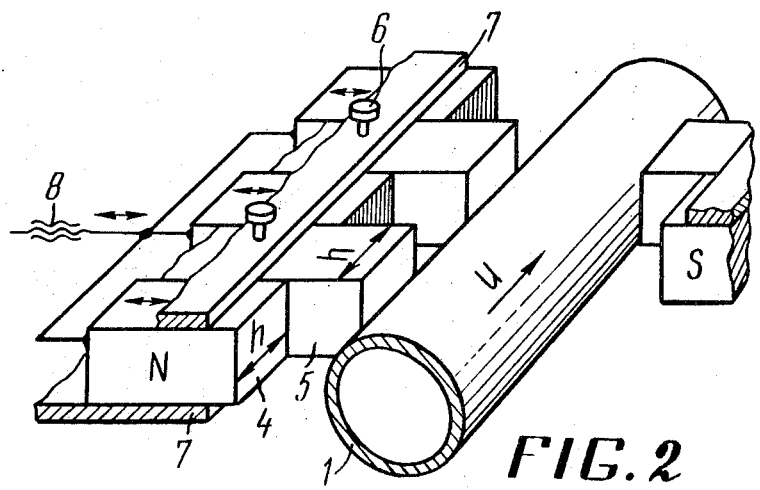
FIG. 2 is a view similar to FIG. 1 but with the poles defined by a set of movable and fixed plates.

FIG. 2 is a representation of a similar device whose poles N and S are formed as a set of movable plates 4 and fixed plates 5. The fixed plates 5 are kept in place by screws 6, and the movable plates 4 are displaced in guides 7 with a feeding mechanism 8. The thickness $h$ of each plate is equal to the inner diameter of the pipe 1. Such a design of the poles N and S allows controlling the flow rate not only by varying the magnetic density B of the external magnetic field (FIG. 1), but also by varying the depth of the recesses 2 and protrusions 3.

Figure 3:
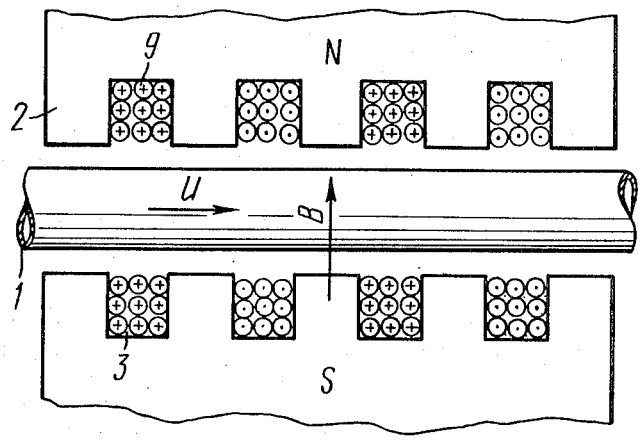
FIG. 3 is an embodiment similar to that of FIG. 1, but with windings mounted in the recesses of the poles, the embodiment being shown in longitudinal partly sectional view.
Figure 4:
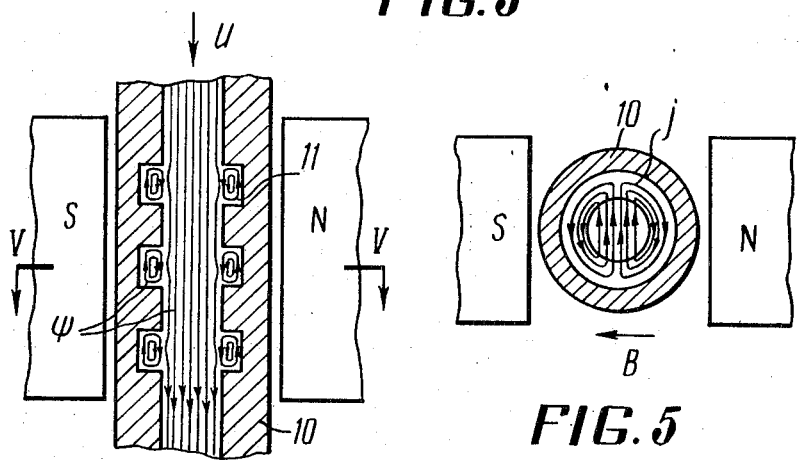
FIG. 4 is longitudinal view of an embodiment of the present invention wherein the through-flow portion of the channel is formed by a number of alternating widenings and contractions.
Figure 5:
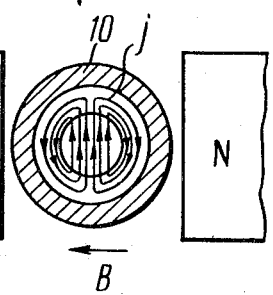
FIG. 5 is a transverse sectional view through the same along line V—V.

FIG. 3 is an illustration of a version of an embodiment of the present invention as of FIG. 1, but with windings 9 disposed in the recesses 3 of the poles N and S of the magnetic system whereby the flow rate may be controlled not only by varying the magnetic density B of the external magnetic field, but also by regulating the electric current flowing in the windings 9. FIGS. 4 and 5 illustrate an embodiment of the present invention for magneto-hydrodynamically controlling the flow rate of a current-conducting liquid, wherein regions having different conditions of electric current induction are established in the through-flow portion of the channel as a number of alternating widenings and contractions. It comprises a magnetic system with poles N and S and a round pipe 10 with widenings in the form of circular branches 11 formed about the inner surface thereof. The ratio of the cross-sectional area of the widenings and contractions of the channel is not less than 1.5:1.

This device operates in the following manner.

As a current-conducting liquid flows at the velocity u in a magnetic field with the density B, there are induced in the liquid electric currents $j$, the magnitude thereof depending on the difference of the emf induced in the flow nucleus and in the circular branches 11, as well as on the electric resistance of the portions through which the currents $j$ flow. Inasmuch as there is practically no movement of the liquid along the channel in the circular branches 11, and in the flow nucleus the velocity of the liquid is the maximum, as indicated in FIG. 4 by the lines $\psi$ of the liquid flow, the difference in the induced emf's is substantial enough. With said ratios of the widenings to the contractions of the channel, the portions wherein the currents j pass have a small electric resistance. All this provides for a substantial magnitude of the currents $j$ induced in the liquid which in turn determine the efficiency of flow rate variation. The flow rate of the liquid is also controlled by varying the magnetic density B using any known techniques.

Figure 6:
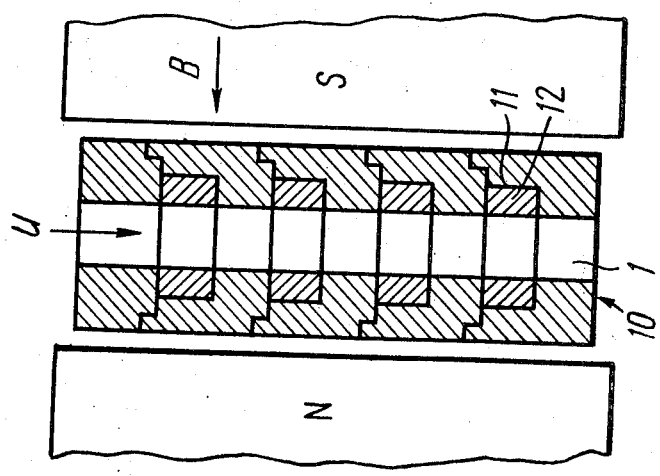
FIG. 6 is a view similar to FIG. 4 but with metal inserts in the widenings of the flow channel.

In the event that the current-conducting liquid is a liquid metal, the foregoing device (FIGS. 4 and 5) is preferably provided with metal inserts 12 (FIG. 6) disposed in the widenings of the channel (circular branches 11) flush with the inner surface of the pipe 10 in the contractions.

These metal inserts should be made of the same metal as that flowing through the channel.

For the convenience of mounting and replacing metal inserts, the channel may be embodied as separate sections butt-joined together.

With such an embodiment of the present invention, as the liquid metal flows at the velocity u through the channel of the pipe 10 containing metal inserts, the latter flash off at the points of contact with the liquid metal.

As a result, there appear widenings wherein there is provided good electric contact of the metal inserts with the liquid metal. In this case, the currents induced in the liquid metal flow partly through the strata of liquid metal retarded in the widenings formed and partly through the remaining solid portions of the metal inserts.

Inasmuch as the material of which the inserts are made is indentical in composition to the liquid metal, the inserts impart no impurities to the liquid metal.

Besides, the initially smooth flow channel prevents air from accumulating in what is known as "air pockets" which would repel the liquid metal from the widenings formed as part of the insert metal melts.

In this process, there are formed zones having different temperatures and, therefore, different velocities and viscosities. All these factors operate to enhance the differences in the conditions of electric current induction in different regions of the current-conducting liquid extending about the length of the flow intermediate the poles of the magnetic system.

Figure 8:
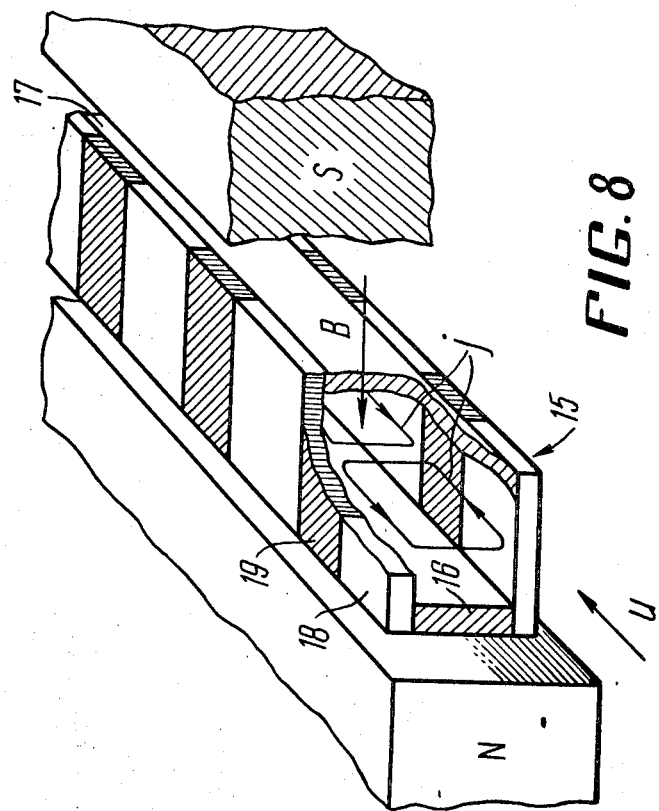
FIG. 8 is a representation of a device in accordance with the present invention, wherein the walls of the channel have sections with different values of electric conductivity.
Figure 7:
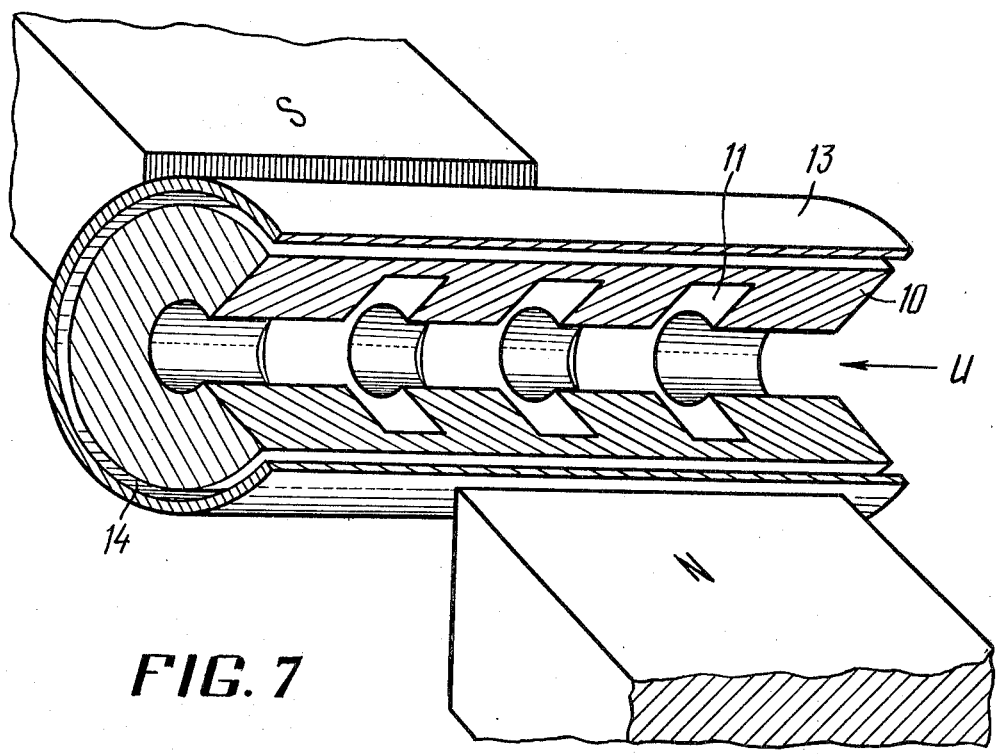
FIG. 7 is a perspective, partially broken away view of a similar embodiment but with the channel provided with an outer cooling jacket.

FIG. 7 is an illustration of an embodiment of the present invention similar to that represented in FIGS. 4 and 5 and provided with a cooling jacket. In this case there are additionally provided zones having different conditions of heat exchange. The current-conducting liquid in the circular branches 11 is materially cooled to the point of total freezing which further contributes to the efficiency of operation of the device. Water, air, etc., may be employed as a cooling agent 14. Apparently such a device is preferably designed with metal inserts 12 according to FIG. 6. FIG. 8 represents an embodiment of the present invention for magneto-hydrodynamically controlling the flow rate of a current-conducting liquid wherein regions having different conditions of electric current induction are provided by establishing about the walls of the channel along the flow portions having different values of electric resistance. The device comprises the poles N and S of a magnetic system and a channel 15 of a rectangular cross-section. The walls 16 and 17 of the pipe 15 parallel to the poles N and S are formed from a conducting material, and the other two walls are sectionalized into alternating non-conducting sections 18 and conducting sections 19. Owing to this design of the channel 15, as a liquid flows through same at a velocity $u$, therein are additionally induced currents $j$ completing a circuit as indicated in the drawing. The flow rate of the liquid is controlled by varying the magnitude of density B of the external magnetic field.

What is claimed is:

1. A device for magneto-hydrodynamically controlling the flow rate of a current-conducting liquid comprising a magnetic system including poles, and means defining a channel including a through-flow portion for said current-conducting liquid disposed intermediate said poles, said poles being located in opposed relation along said channel, said poles constituting at least in part means for varying along said channel the conditions of electric current induction in said current-conducting liquid, there being regions having different conditions of electric current induction in said current-conducting liquid caused by the action of the second said means and extending substantially along the length of said channel, at least one of said poles of said magnetic system being shaped in the form of a plurality of alternating protrusions and recesses, said regions having different conditions of electric current induction being disposed opposite said protrusions and recesses, similar points of the adjacent protrusions of each pole being spaced by two times the transverse dimension of the through-flow portion of the channel in a longitudinal plane parallel to the poles of said magnetic system, the depth of the recesses being not less than the spacing between the protrusion of opposite poles.

2. A device for magneto-hydrodynamically controlling the flow rate of a current-conducting liquid comprising a magnetic system including poles, and means defining a channel including a through-flow portion for said current-conducting liquid disposed intermediate said poles, said poles being located in opposed relation along said channel, said poles constituting at least in part means for varying along said channel the conditions of electric current induction in said current-conducting liquid, there being regions having different conditions of electric current induction in said current-conducting liquid caused by the action of the second said means and extending substantially along the length of said channel, at least one of said poles of said magnetic system being shaped in the form of a plurality of alternating protrusions and recesses, said regions having different conditions of electric current induction being disposed opposite said protrusions and recesses, at least one pole of the magnetic system including a set of plates at least one of which can be moved relative to the other of said plates.

3. A device as claimed in claim 2 wherein the thickness of each plate is equal to the transverse dimension of the through-flow portion of said channel in a longitudinal plane parallel to the poles of said magnetic system.

4. A device as claimed in claim 2 wherein at least one of the poles of said magnetic system includes windings disposed in said recesses.

5. A device for magneto-hydrodynamically controlling the flow rate of a current-conducting liquid comprising a magnetic system including poles, and means defining a channel including a through-flow portion for said current-conducting liquid disposed intermediate said poles, said poles being located in opposed relation along said channel, said poles constituting at least in part means for varying along said channel the conditions of electric current induction in said current-conducting liquid, there being regions having different conditions of electric current induction in said current-conducting liquid caused by the action of the second said means and extending substantially along the length of said channel, at least one of said poles of said magnetic system being shaped in the form of a plurality of alternating protrusions and recesses, said regions having different conditions of electric current induction being disposed opposite said protrusions and recesses, the through-flow portion of said channel being formed as a plurality of alternating widenings and contractions in order to vary along the channel the conditions of electric current induction in a current-conducting liquid, said widenings and contractions of the through-flow portion of said channel being the regions having the different conditions of electric current induction in the current-conducting liquid.

6. A device as claimed in claim 5 wherein the ratio of the cross-sectional areas of one said widening and contraction is not less than approximately 1.5:1.

* * * * *